March 25, 1958  G. C. MOLYNEUX ET AL  2,827,777
CONSTANT VELOCITY DRIVE MEANS
Filed Oct. 4, 1956  3 Sheets-Sheet 2

INVENTORS
GREVOR CHILTON MOLYNEUX,
JOHN BARRIE McMAHON &
JOHN BLACKLER

BY Young, Emery & Thompson
ATTYS.

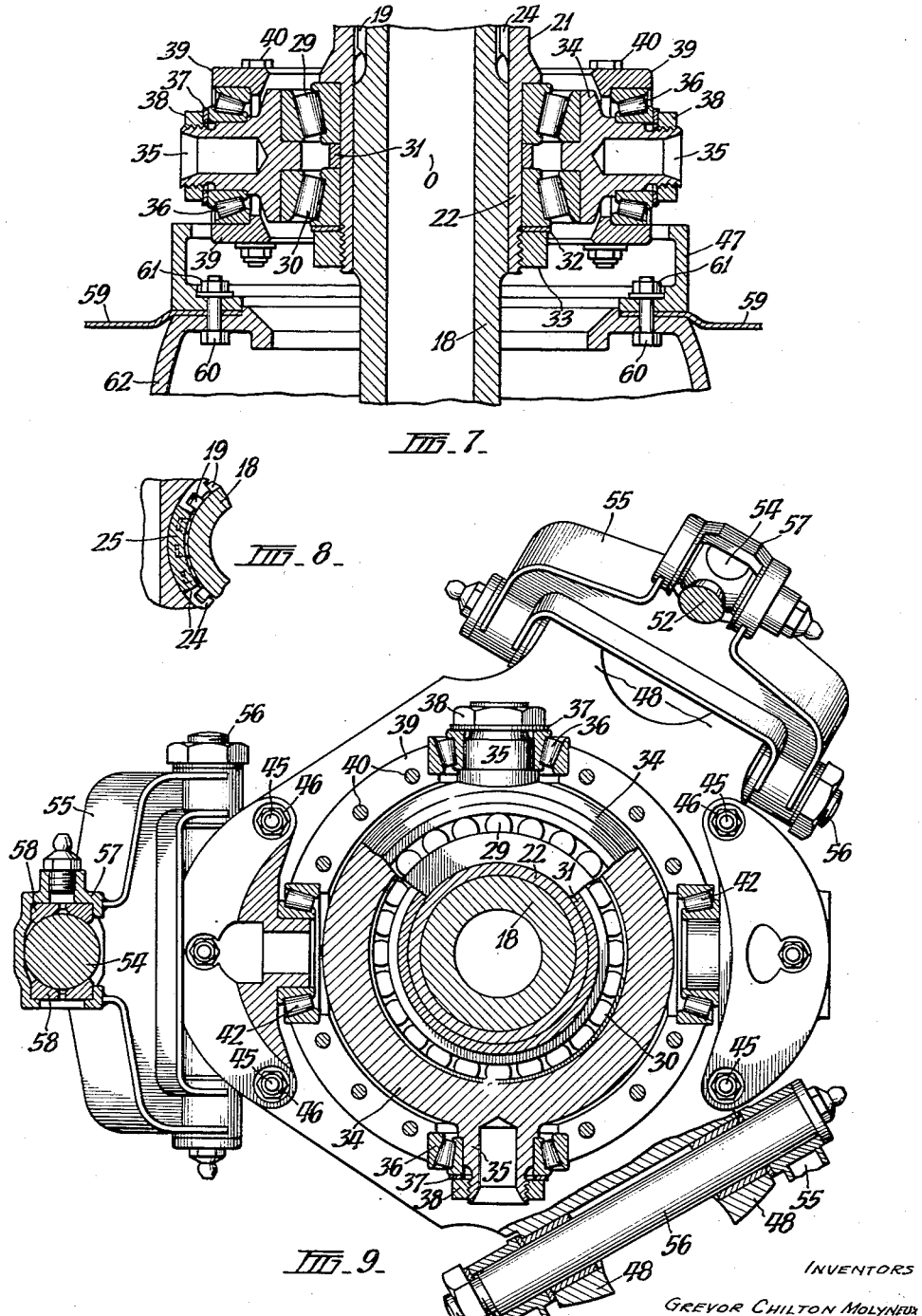

United States Patent Office 2,827,777
Patented Mar. 25, 1958

2,827,777

CONSTANT VELOCITY DRIVE MEANS

Grevor C. Molyneux, North Balwyn, Victoria, John B. McMahon, Kew, Victoria, and John Blackler, Drummoyne, Sydney, New South Wales, Australia, assignors to The Molyneux Helicopter Company Proprietary Limited, Victoria, Australia, a company of Australia Application October 4, 1956, Serial No. 614,021

4 Claims. (Cl. 64—21)

This invention relates to constant velocity drive means and is concerned more particularly although not necessarily exclusively with a constant velocity drive means for a helicopter rotor.

In helicopter construction it is desirable for travelling movement without the risk of setting up large hub stresses that the or each rotor should be connected to its driving shaft by a universal coupling which allows the rotor to tilt in any direction. For a considerable part of the time in which a helicopter rotor is operating the rotor is tilted so that a line normal to it is inclined at an angle of up to several degrees to the drive shaft axis. Because of this inclination cyclic inertia forces are liable to be set up when known types of universal couplings are used and these forces may set up undesirable vibrations and are likely to cause fatigue failures in the rotor and transmission system.

It is an object of this invention to provide an improved coupling suitable for helicopter rotors and with this object in view a rotor according to one form of this invention may be characterised by employing articulated driving arms.

More particularly driving means according to the present invention may comprise a driving member fixed to a shaft and a driven member constrained to rotate about an axis which intersects the axis of the shaft and can itself rotate about the point of intersection, and toggle members connected together by a universal joint connection, one toggle member being pivotally connected to the driving member and constrained to remain in a plane extending through the axis of the shaft, and the other toggle member being pivotally connected to the driven member and constrained to remain in a plane extending through the axis of rotation of the driven member, characterised in that the lengths of the toggle members are equal, in that the radial distance of the pivoting centres of the toggles from their respective axes are equal and in that the distances of the said pivoting centres measured from the point of intersection of the axes along their respective axes are also equal.

Figure 1:
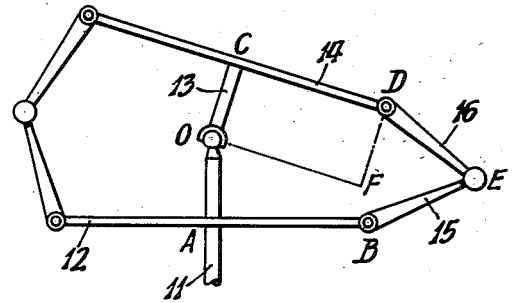
Figure 2:
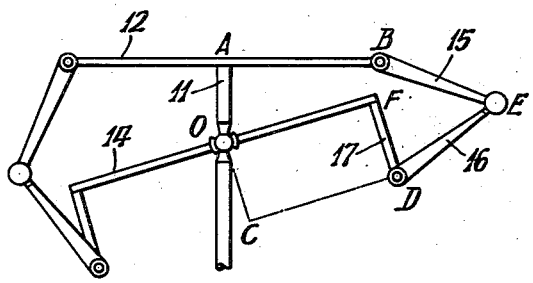
Figure 3:
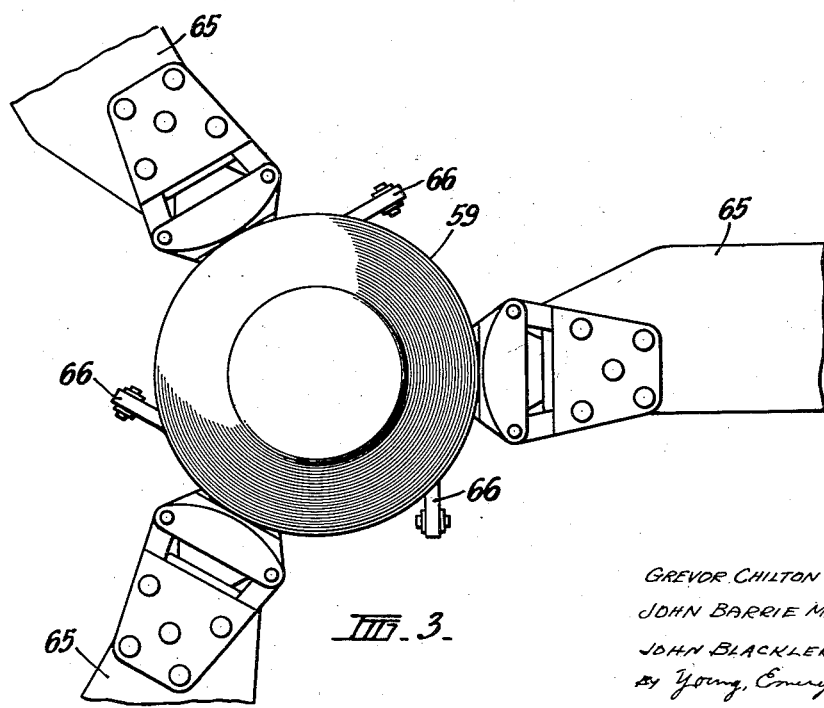
Figure 4:
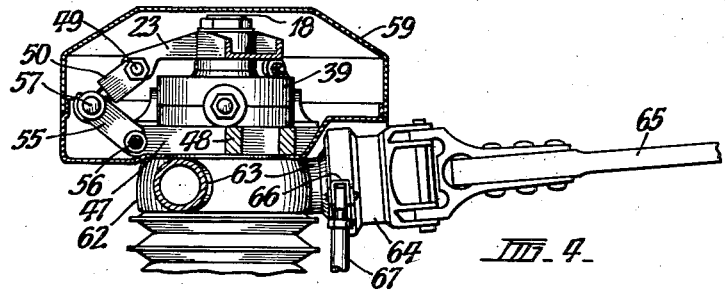
Figure 5:
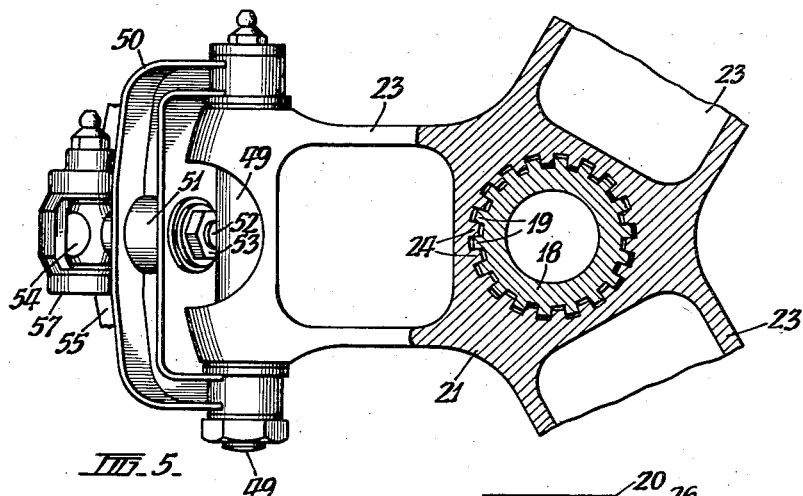
Figure 6:
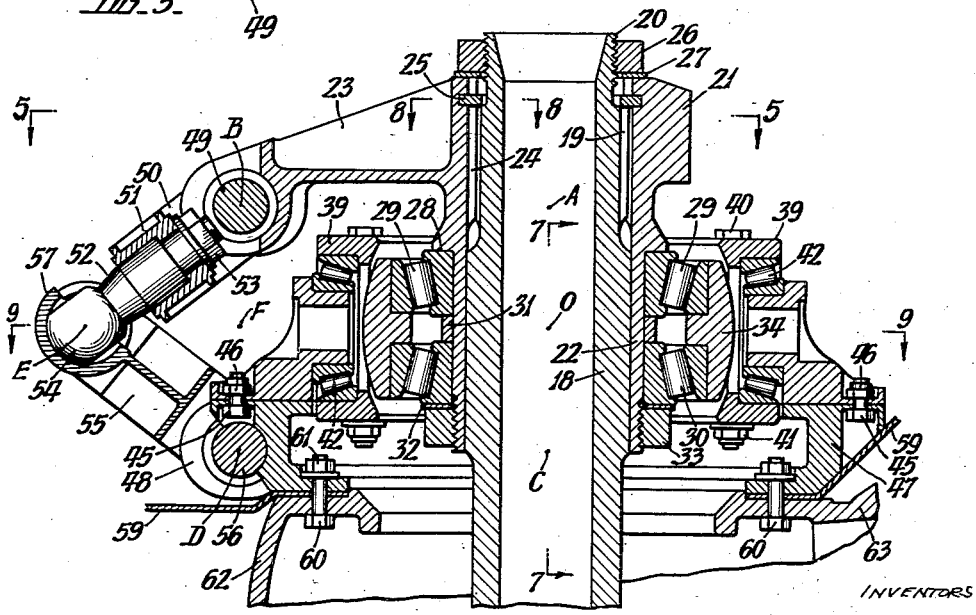

Other objects and features of the invention will be evident from the following description wherein reference is made to the accompanying drawings. In this description:

Figure 1 is a diagrammatic view in elevation illustrating the principle of a constant velocity drive, Figure 2 is a view similar to Figure 1 illustrating a modification of the principle shown therein, which is more suitable for a helicopter rotor construction, Figure 3 is a plan view of a practical construction of helicopter rotor based on the diagrammatic construction shown in Figure 2, Figure 4 is a view in elevation of the rotor shown in Figure 3 with part of the casing cut away, Figure 5 is an enlarged view in vertical section of the rotor shown in Figures 3 and 4, on the plane 5—5 of Figure 6, Figure 6 is a plan view, partly in section, Figure 7 is a view in section on the plane 7—7 of Figure 6, Figure 8 is a fragmentary plan view on the plane 8—8 of Figure 6, and Figure 9 is a sectional plan view on the plane 9—9 of Figure 6.

Referring firstly to Figure 1 of the drawings there is illustrated therein a principle for obtaining a constant velocity drive from a shaft to a member which is tiltable with respect to the shaft. The shaft 11 has fixed to it a disc or plate 12 which intersects the shaft at the point A. A tiltable shaft 13 is connected to the shaft 11 so as to be capable of moving in any direction about their intersecting point O, and a rotary member 14 is fixed at right angles to the shaft 13, intersecting it at the point C.

Two toggle members 15 and 16 are pivotally connected to the members 12 and 14 respectively at B and D, in such a manner that they are constrained to move in planes containing the axes of the shafts 11 and 13 respectively, and the other ends of the toggle members are connected together at E by a ball and socket or other joint which permits relative pivoting movement in any direction. It can be shown quite readily that if the distances OA and OC are made equal, and the distances AB and CD are also made equal (in other words if the radial and axial components, with respect to the shaft 11, of the centre of the pivot at B from the centre of gyration at O are respectively equal to the radial and axial components, with respect to the shaft 13, of the centre of the pivot at D from the centre of gyration of O), and furthermore if the lengths of the toggle members are equal so that BE=DE, then the arrangement is completely symmetrical and if the shaft 11 is turned at a uniform rate and the shaft 13 and rotary member 14 are constrained to rotate about the axis of the shaft 13 their rotation will also be uniform. During such movement the toggle comprising the members 15 and 16 opens as the points B and D diverge from their proximate positions shown.

It will be evident that instead of providing the shaft 13 and the rotary member 14 to give the correction location in space of the point D, the rotary member may be in the same plane as its centre of gyration O and a projection extending out of this plane may be provided to locate the point D. Thus in Figure 1 the line OF illustrates a suitable position for the rotary member and the line FD represents the projection extending out of the plane of the rotary member.

Figure 2 illustrates a modification of the principle shown in Figure 1 wherein the disc or plate 12 is mounted on the shaft 11, intersecting it at the point A which in this case is above the point O. The tiltable shaft is dispensed with and the rotary member 14 is mounted so that it can gyrate about the point O which is in the plane of the rotary member 14. A projection 17 extends out of the plane of the member 14 from the point F away from the plate 12, and the point D is thus located in space in the same way as if the tiltable shaft had extended from O along the chain-dotted line to the point C and the rotary member had been fixed at right angles to this shaft at this point. Two toggle members 15 and 16 are pivotally connected to the members 12 and 17 respectively, the pivots being such as to constrain the toggle members to move in the planes containing the lines OA and OC respectively, and the toggle members are connected together at E by a universal joint. As before, if the shaft 11 is rotated uniformly the member 14 will also rotate uniformly provided that OA=OC=FD, AB=CD=OF, and BE=DE.

In practice it is desirable to employ the principle illustrated in Figure 2, to use a plurality of pairs of toggle members at spaced intervals, and to support the rotary member from the shaft by a gimbal arrangement.

A preferred practical construction which is illustrated in Figures 4 to 9 comprises a shaft 18 having splines 19 near its upper end and externally screw-threaded above the splines at 20. The shaft is fitted with a driving member 21 comprising a sleeve 22, which fits over the shaft, and three integral radially projecting arms 23 spaced at 120° apart. The upper section of the sleeve 22 is provided with splines 24 to mate with those on the shaft. A split locating ring 25 is let into an annular recess in the driving member 21 and this bears on the top of the splines 19 when the shaft is inserted from the bottom of the member 21. The member 21 and the shaft 18 are held together by a nut 26 screwed on the end of the shaft with a washer 27 interposed between the nut and the member 21.

The sleeve 22 has a downwardly directed shoulder 28 against which an assembly of two tapered roller axial and thrust bearings 29 and 30 and a spacing ring 31 is held by a washer 32 and a nut 33 which is screwed onto the lower end of the sleeve, this end being screw-threaded for the purpose. The outer races of the bearings 29 and 30 are mounted and held in a ring 34 which is recessed to receive the bearings and has a spherical exterior surface except for two radial projections or spigots 35 which are diametrically opposite each other. The spigots 35 each carry a tapered roller bearing 36 held in place by a washer 37 and a nut 38 screwed onto the end of the spigot.

The bearings 36 are supported in appropriately shaped recesses in a gimbal ring 39, which is made in two axially separable halves held together by bolts 40 and nuts 41 and just gives a clearance for the ring 34. The gimbal ring 39 is also provided with recesses to house two further tapered roller bearings 42 which are diametrically opposite each other and spaced at 90° from the bearings 36. The bearings 42 are supported on spigots 43 of two trunnion blocks 44 which are fastened by bolts 45 and nuts 46 to a torque ring 47. The torque ring 47 which is an annular member with three radial projections 48 spaced at 120° apart is thus free to turn in any direction about the point O in Figures 5 and 7 on the axis of the shaft 18, but is prevented from moving bodily in any direction.

Each of the radially projecting arms 23 of the driving member 21 is shaped and machined at its distal end to receive a pivot pin 49 having its axis at right angles to the axis of the shaft 18 and to the central radial line of the arm 23. Each pivot pin 49 carries a U-shaped shackle 50 having a hollow boss 51 in which a short rod 52 is engaged and secured by a nut 53. The axis of the rod 52 is thus constrained to be at all times in the plane containing the central radial line of the arm 23 supporting its shackle and the axis of the shaft 18. This distal end 54 of each rod 52 is made spherical, with flats left on opposite sides for assembly purposes.

Each shackle 50 and its rod 52 together form an upper toggle member, and each of these toggle members is engaged with a lower toggle member comprising a U-shaped shackle 55. Each shackle 55 is connected by a pivot pin 56 to one of the radial projections 48 on the torque ring 47, the projections being shaped and machined to receive the pins 56 with the axis thereof at right angles to the axis of the shaft 18 and to the central radial lines of the projections 48. The shackles 55 are thus constrained so that their centre lines remain in the planes containing the said central radial lines and the axis of the shaft 18.

The distal ends 57 of the shackles 55 are each shaped and machined to provide a cylindrical socket open at one side and this socket contains two bearing pads 58. The bearing pads 58 are provided with part-spherical concave surfaces suitable to bear against the ends 54 of the rods 52, and the dimensions of these parts are arranged so that the ends 54 may be engaged in the sockets 57 with proper working clearance.

It will be seen that the arrangement described is a practical construction based on the diagrammatic illustration of Figure 2. The point O has already been identified, and the points B, D and E are located at the centres of the spindles 49 and 56 and the part-spherical end 54. Referring to Figure 5, the points A and C are located at the intersection of the axis of the shaft 18 with the horizontal lines through B and D respectively, and the point F is located at the intersection of the horizontal line through O with the vertical line through D. The mechanism is arranged so that the relationship previously discussed with reference to Figure 2 holds, i. e. $OA=OC=FD$, $AB=CD=OF$, and $BE=DE$. Hence when the shaft 18 is rotated at a uniform rate the torque ring 47 will also turn at a uniform rate about its own axis, i. e. without cyclic variation of speed, irrespective of whether it is at right angles to the axis of the shaft 18 or oblique to it.

The assembly of the driving member 21, the torque ring 47, the toggle members, and the gimbal support, is all enclosed in a housing 59 which is attached to the torque ring by bolts 60 and nuts 61. These bolts and nuts also fasten the torque ring 47 to a spider 62 having radial arms 63, on which pitch changing sleeves 64 carrying the rotor blades 65 are supported. The sleeves 64 carry arms 66 to which rods 67 are connected for controlling change of pitch of the blades.

While it is preferred to employ a number of pairs of torque arms, only one pair will suffice. Where there is more than one pair, it is preferred that the lengths of all the upper torque arms should be the same but this is not essential. In place of the gimbal ring construction any other universal joint construction which allows tilting of the torque ring in any direction may be used.

We claim:

1. A coupling for effecting a constant velocity drive between a driving member fixed on a shaft and thereby constrained to rotate about its axis and a driven member comprising a torque ring supported on the shaft on a gimbal arrangement and thereby constrained to rotate about another axis which intersects the axis of the driving member and which can itself pivot in any direction about the point of intersection, comprising toggle members connected together by a universal joint, one of said toggle members being pivotally connected to the driving member and constrained so that its medial line which passes through the centre of the universal joint always remains in a plane containing the axis of rotation of the driving member, the other of said toggle members being pivotally connected to the driven member and constrained so that its medial line which passes through the centre of the universal joint always remains in a plane containing the axis of rotation of the driven member, the lengths of the toggle members being equal, the radial distances of their pivoting centres from the respective axes of the members to which they are connected being equal, and the distances of the pivoting centres measured from the point of intersection of the axes along the respective axes of the members to which they are connected also being equal.

2. A coupling according to claim 1 having a plurality of pairs of toggle members.

3. A coupling according to claim 1 wherein the gimbal arrangement comprises an inner ring rotatably supported on the shaft and constrained against other movement, a gimbal ring surrounding the inner ring and connected thereto by pivots diametrically disposed with respect to both rings, other pivots connecting the gimbal ring to the torque ring, said other pivots being diametrically disposed with respect to both the gimbal ring and the torque ring and being at 90° to the line of the first mentioned pivots with respect to the gimbal ring.

4. A coupling for effecting a constant velocity drive between a driving shaft and a helicopter rotor assembly while permitting said assembly to tilt relative to the axis of the shaft, comprising a driving member fixed on the shaft, an inner ring supported on bearings for rotation on said shaft but constrained against bodily movement, two spigots extending from the ring on opposite sides thereof with their axes on a diameter of the inner ring, bearings mounted on said spigots, a gimbal ring surrounding the inner ring and housing the said bearings in diametrically opposed recesses, said gimbal ring having other diametrically spaced recesses spaced at 90° from the first mentioned recesses and housing two other bearings, a torque ring, two trunnion blocks fastened to the torque ring and having spigots on which said two other bearings are mounted, a pivot pin mounted in the driving member with its axis at right angles to a plane through the axis of the shaft, a second pivot pin mounted in the torque ring with its axis at right angles to a plane through the axis of the torque ring, the distance of the first pivot pin from the axis of the shaft being equal to the distance of the second pivot pin from the axis of the torque ring, and the distances of each pivot pin from the common geometric centre of the inner ring and the gimbal ring being also equal a pair of toggle members connected together by a ball and socket joint, said toggle members being mounted for pivoting movement on the respective pivot pins whereby the medial lines of said toggle members passing through the centre of the ball and socket are constrained to remain in planes containing the axis of the shaft and the axis of the torque ring respectively, and the distances of each pivot pin from the centre of the ball and socket joint are equal, and means connecting the torque ring to the rotor assembly.

References Cited in the file of this patent

UNITED STATES PATENTS

| | | |
|---|---|---|
| 125,880 | Clemens | Apr. 23, 1872 |
| 1,498,876 | Ingoldby | June 24, 1924 |
| 1,853,171 | Nettenstrom | Apr. 12, 1932 |
| 2,440,225 | Pullin | Apr. 20, 1948 |
| 2,475,293 | Pentecost et al. | July 5, 1949 |